United States Patent
Kelly et al.

(10) Patent No.: US 10,852,432 B2
(45) Date of Patent: Dec. 1, 2020

(54) DUAL MODE LASER TARGET DESIGNATOR/RANGEFINDER WITH AN OPTICAL PARAMETRIC OSCILLATOR-OPTICAL PARAMETRIC AMPLIFIER (OPO-OPA) CONVERTER

(71) Applicant: BAE SYSTEMS INFORMATION AND ELECTRONIC SYSTEMS INTEGRATION INC., Nashua, NH (US)

(72) Inventors: David P. Kelly, Nashua, NH (US); John C. McCarthy, Hampton, NH (US); Christopher A. Miller, Mont Vernon, NH (US); Hermanus S. Pretorius, Derry, NH (US); Katherine J. Snell, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 719 days.

(21) Appl. No.: 15/352,029

(22) Filed: Nov. 15, 2016

(65) Prior Publication Data
US 2018/0138652 A1 May 17, 2018

(51) Int. Cl.
| | | |
|---|---|---|
| G01S 17/00 | (2020.01) | |
| G01S 17/08 | (2006.01) | |
| G01S 7/481 | (2006.01) | |
| G01S 7/484 | (2006.01) | |
| G01S 17/10 | (2020.01) | |
| F41G 3/14 | (2006.01) | |
| H01S 3/00 | (2006.01) | |
| G02F 1/39 | (2006.01) | |

(52) U.S. Cl.
CPC .............. *G01S 17/08* (2013.01); *F41G 3/145* (2013.01); *G01S 7/484* (2013.01); *G01S 7/4814* (2013.01); *G01S 17/10* (2013.01); *H01S 3/0092* (2013.01); *G02F 1/39* (2013.01)

(58) Field of Classification Search
CPC ...................................................... F41G 3/145
USPC .............................................. 356/3.01–5.15
See application file for complete search history.

(56) References Cited

U.S. PATENT DOCUMENTS

| | | | | |
|---|---|---|---|---|
| 5,687,186 | A * | 11/1997 | Stultz | G01S 17/10 359/328 |
| 6,084,682 | A * | 7/2000 | Zare | G01N 21/39 356/437 |
| 6,822,742 | B1 * | 11/2004 | Kalayeh | G01N 21/39 356/437 |

(Continued)

*Primary Examiner* — James R Hulka
(74) *Attorney, Agent, or Firm* — Sand, Sebolt & Wernow LPA; Scott J. Asmus

(57) ABSTRACT

The current disclosure is directed to an apparatus and method of a Laser Designator/Rangefinder (LDR) having two wavelengths of 1064 nm and 1572 nm. The 1064 nm wavelength laser is generated by a pump diode by exciting Nd:YAG medium (source). The 1572 nm wavelength laser is produced using an OPO-OPA converted which is located in a by-pass path. Because the 1572 nm wavelength uses near diffraction limited signal, it provides long range identification and tracking capability needed for advanced tactical platforms, while using the smallest transmit aperture, in a low Size, Weight and Power Consumption (SWaP) package.

19 Claims, 5 Drawing Sheets

(56) References Cited

U.S. PATENT DOCUMENTS

| | | | |
|---|---|---|---|
| 6,965,621 B2 * | 11/2005 | McCarthy | G02F 1/39 359/330 |
| 7,474,685 B2 * | 1/2009 | Kalayeh | G01N 21/3504 372/20 |
| 7,486,435 B2 * | 2/2009 | Slater | G02F 1/39 359/326 |
| 7,583,364 B1 * | 9/2009 | Mayor | G01N 21/538 356/4.01 |
| 7,688,247 B2 * | 3/2010 | Anschel | G01S 7/495 342/14 |
| RE42,499 E * | 6/2011 | Weston | H01S 3/094084 359/345 |
| 8,184,667 B2 * | 5/2012 | Chiang | H01S 3/115 372/10 |
| 9,810,775 B1 * | 11/2017 | Welford | H01S 3/113 |
| 9,810,786 B1 * | 11/2017 | Welford | G01S 7/4814 |
| 9,905,992 B1 * | 2/2018 | Welford | H01S 3/0941 |
| 10,079,468 B2 | 9/2018 | Snell et al. | |
| 10,348,051 B1 * | 7/2019 | Shah | H01S 3/06712 |
| 10,401,478 B2 * | 9/2019 | Pais | G01S 13/04 |
| 10,418,776 B2 * | 9/2019 | Welford | H01S 3/1022 |
| 2005/0213619 A1 * | 9/2005 | McCarthy | G02F 1/39 372/21 |
| 2006/0007967 A1 * | 1/2006 | Nettleton | G02F 1/39 372/20 |
| 2006/0268947 A1 * | 11/2006 | Kalayeh | G01N 21/39 372/20 |
| 2007/0206177 A1 * | 9/2007 | Anschel | F41H 11/02 356/28 |
| 2011/0075688 A1 * | 3/2011 | Chiang | G02F 1/292 372/12 |
| 2016/0377703 A1 * | 12/2016 | Pais | G01S 7/411 342/27 |
| 2018/0166848 A1 * | 6/2018 | Snell | H01S 3/1675 |

\* cited by examiner

DUAL MODE LASER TARGET DESIGNATOR/RANGEFINDER WITH AN OPTICAL PARAMETRIC OSCILLATOR-OPTICAL PARAMETRIC AMPLIFIER (OPO-OPA) CONVERTER

STATEMENT OF GOVERNMENT INTEREST

This invention was made with United States Government support under Contract No. 14-C-8215.

BACKGROUND

Technical Field

Generally, the present disclosure relates to a laser target designator. More particularly, the present disclosure relates to a method and apparatus for incorporating operating modes and design elements into legacy laser target designators which enables long range precision imaging, object identification, tracking, and active target designation for both tactical and eyesafe operating modes.

Background Information

The remarkable feature of laser is that it can be concentrated to very high energy and intensity over long distances. This is why the laser is used as a target designator or a rangefinder. A LADAR (LAser Detection And Ranging) system allows a user to measure distance to a target by illuminating the target with laser light and measuring time of flight of the laser pulse.

Laser target designator/rangefinder systems may include more than one laser source and these systems can consume large amounts of energy and be quite heavy. Since LADAR systems can be installed in aircraft or helicopters, the size, weight, and energy consumption are important factors. Furthermore, in previously known systems, the laser quality may be quite low so that the system works best in clear atmospheric conditions. Cloud, rain, or smoke can make reliable target designation difficult or even impossible. Since conventional LADAR systems typically include an optical parametric oscillator and optical parametric amplifier that generates a beam spot size which is greater than 3 mm in diameter, these system produce beams of lower quality.

SUMMARY

There is a need in the industry for a laser target designator/rangefinder system that takes up less space, is lighter in weight, consumes less energy and produces lasers of improved quality. The laser target designator/rangefinder system (hereafter LDR system) disclosed herein addresses many of the shortcomings of conventional systems.

The improved LDR system disclosed herein is optically more complex than previously known systems and may be configured in smaller and lighter packages. The present system provides a longer range of effectiveness by using a diffraction limited laser beam.

In one aspect, an embodiment of the present disclosure may provide a long range laser target designator/rangefinder (LDR) system comprising: (1) a 1064 nm wavelength laser, wherein a medium of the laser is adapted to be excited by a laser pumping source, (2) an optical beam selector, wherein the selector is selectable between a range finding mode and a target designation mode, and (3) an optical parametric oscillator-optical parametric amplifier (OPO-OPA) converter system wherein the converter system comprises an OPO-OPA converter, a half wave plate and a beam reducer, wherein the 1064 nm wavelength laser passes through the OPO-OPA converter system if the range finding mode is selected, and wherein the 1064 nm wavelength laser does not pass through the OPO-OPA converter system if the target designation mode is selected.

In another aspect, an embodiment of the present disclosure may provide a method of determining a range of a target and designating the target comprising steps of: (1) providing a long range laser target designator/rangefinder (LDR system) including an Optical Parametric Oscillator-Optical Parametric Amplifier converter (OPO-OPA converter) having a beam expander, a half wave plate and a polarizer, (2) pumping a laser source, (3) generating a 1064 nm wavelength laser beam, (4) directing the 1064 nm wavelength laser beam through the beam expander, through the half wave plate and into the polarizer, and (5) splitting the laser beam in the polarizer into a first split laser beam and a second split laser beam.

In another aspect, the current disclosure is directed to a Laser Designator/Rangefinder (LDR) having two wavelengths of 1064 nm and 1572 nm. The 1064 wavelength laser is generated by a pump diode by exciting Nd:YAG medium (source). The 1572 nm wavelength laser is produced using an OPO-OPA converted which is located in a by-pass path. Because the 1572 nm wavelength uses a near diffraction limited signal, it provides long range identification and tracking capability needed for advanced tactical platforms, while using the smallest transmit aperture, in a low Size, Weight and Power Consumption (SWaP) package.

In another aspect, the embodiment of the disclosure may provide a long range laser target designator/rangefinder system (LDR system) comprising a laser pumping source; a pulsed 1064 nm pump laser; and an Optical Parametric Oscillator-Optical Parametric Amplifier converter including a non-linear Optical Parametric Oscillator (OPO) and an Optical Parametric Amplifier (OPA), wherein the OPO-OPA converter provides near a diffraction limited laser output at about 1.5 µm.

In another aspect, the embodiment of the disclosure may provide a system of a long range laser target designator/rangefinder (LDR) system, comprising a 1064 nm wavelength laser, wherein a medium of the laser is adapted to be excited by a diode pumping laser; an optical beam selector, wherein the selector allows to choose between a tactical mode and a training mode; and an optical parametric oscillator-optical parametric amplifier (OPO-OPA) converter system wherein the converter system comprises an OPO-OPA converter, a plurality of mirrors, an OPO output coupler, at least one beam reducer, at least one beam expander, at least one polarizer, and at least one half wave plate.

In another aspect, the embodiment of the disclosure may provide a method of generating a long range LDR system, comprising steps of providing a diode pump laser and a Nd:YAG laser; providing power to the diode pumping laser; exciting the Nd:YAG laser to generate a 1064 nm wavelength laser beam; and determining between a tactical mode for 1064 nm wavelength and a training mode for 1572 nm wavelength.

BRIEF DESCRIPTION OF THE SEVERAL VIEWS OF THE DRAWINGS

A sample embodiment of the disclosure is set forth in the following description, is shown in the drawings and is particular and distinctly pointed out and set forth in the appended claims. The accompanying drawings, which are fully incorporated herein and constitute a part of the specification, illustrate various examples, methods, and other example embodiments of various aspects of the invention.

Similar numbers refer to similar parts throughout the drawings.

DETAILED DESCRIPTION

The present disclosure generally relates to a laser target designator/rangefinder (LDR) system 11 and the method of using the same. The LDR system 11 provides accurate directional distance and vertical angle information of an enemy target.

Figure 1:
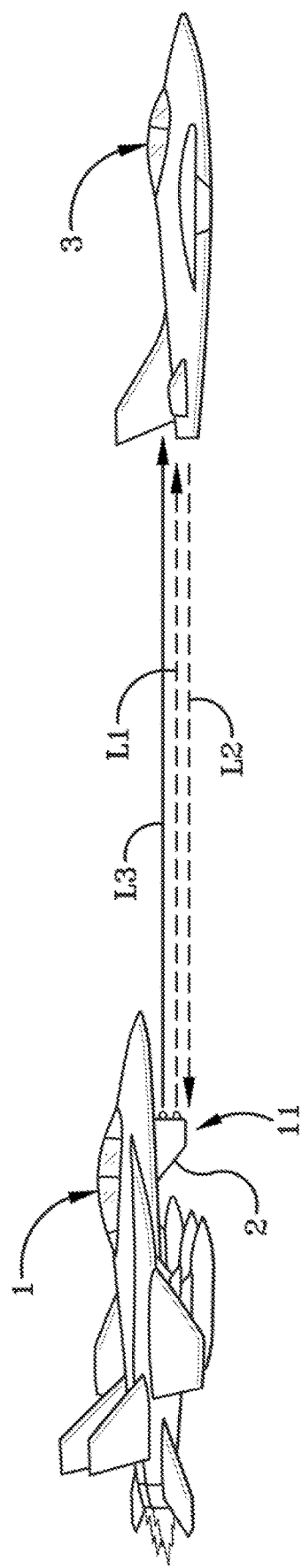
FIG. 1 is an exemplary schematic view of a Laser target Designator/Rangefinder (LDR) system installed in a first aircraft to determine the range to a second aircraft.

FIG. 1 illustrates a schematic view of the LDR system 11 which is installed with an aircraft 1. The LDR system 11 is located inside of a housing 2. As shown in the figure, the aircraft 1 shoots radar signals into the air or on the ground to search objects. As a pilot of the aircraft 1 finds an enemy target 3 in the air or on the ground, then the LDR system emits a first laser signal L1 to the enemy target 3 and detects bounced laser L2 to measure the distance to the enemy target 3. The range finding activity is performed using a laser which has frequency around 1500 nm. Since the laser frequency is greater than 1400 nm, it is an eyesafe laser. Once the distance to the enemy target is measured, a third laser L3 is emitted toward the enemy target 3 to designate (the term designation means to mark the target with a dot of light). The designation of the enemy target 3 is performed using a laser with frequency around 1000 nm because most of the seekers installed in missiles follow this particular frequency. Once the enemy target 3 is designated, a missile can be fired to shoot down the enemy target 3.

Figure 2:
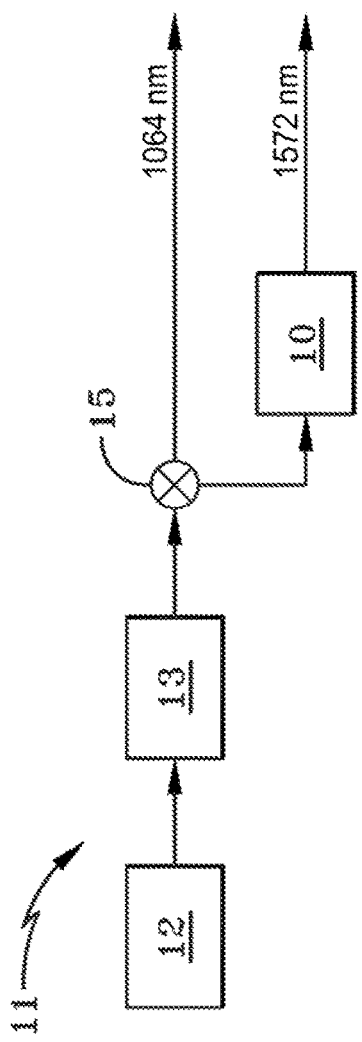
FIG. 2 is an exemplary schematic view of a conventional OPO-OPA converter configuration of the LDR system.

FIG. 2 illustrates the LDR system 11 which comprises an optical parametric oscillator-optical parametric amplifier (OPO-OPA) converter system 10 to convert a 1064 nm wavelength laser to a 1572 nm wavelength laser in the LDR system 11 which requires a dual-mode laser emitting at 1064 nm for laser target designation and 1572 nm for laser range finding and target illumination for active imaging. As shown, the LDR system 11 further comprises a diode pumping laser 12, an Nd:YAG laser 13, an optical beam selector 15, and the OPO-OPA converter system 10.

Figure 3:
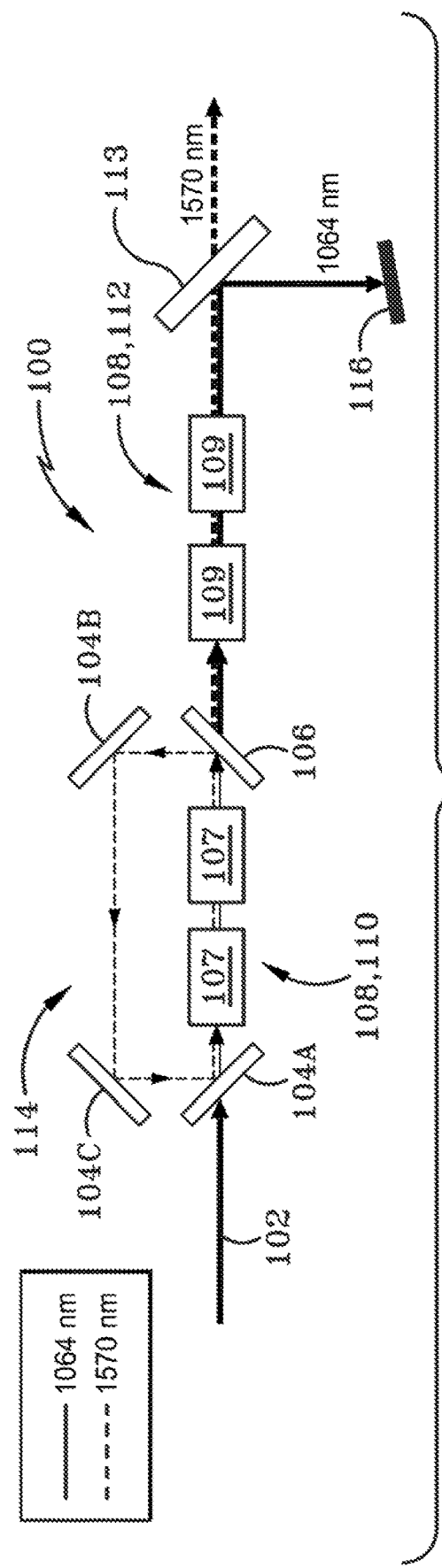
FIG. 3 is an exemplary schematic view of a conventional OPO-OPA converter configuration of the LDR system.

Referring to FIG. 3, a conventional OPO-OPA converter system 100 is shown. As shown in FIG. 3, the conventional OPO-OPA converter system 100 comprises a laser 102, a plurality of mirrors 104A, 104B, 104C, 113, an OPO output coupler 106, a beam absorber 116, and an OPO-OPA converter 108. The OPO-OPA converter comprises an OPO 110 and an OPA 112. A cavity 114 comprises three mirrors 104A, 104B, 104C, the OPO output coupler 106, and the OPO 110.

The mirrors 104A, 104B, 104C are high transmitive at 1064 nm and high reflective at 1570 nm mirrors. The mirror 113 is a high reflective at 1064 nm and high transmitive at 1570 nm mirror. The OPO comprises a plurality of OPO crystals 107. The OPA 112 comprises a plurality of OPA crystal 109. Because the OPO-OPA converter system 100 utilizes 10 times diffraction limited signal, and the laser 102 directly heads toward the cavity 114 without reducing the beam size, pump energy density must be limited to a safe operating level of 2-2.5 J/cm$^2$ to avoid optically induced damage to the OPO-OPA crystal. Since the OPO-OPA converter system 100 utilizes the beam whose energy is not reduced and whose spot size is greater than 3 mm in diameter, the OPO-OPA converter system 100 only has 10 times diffraction limited laser beam quality.

Figure 4:
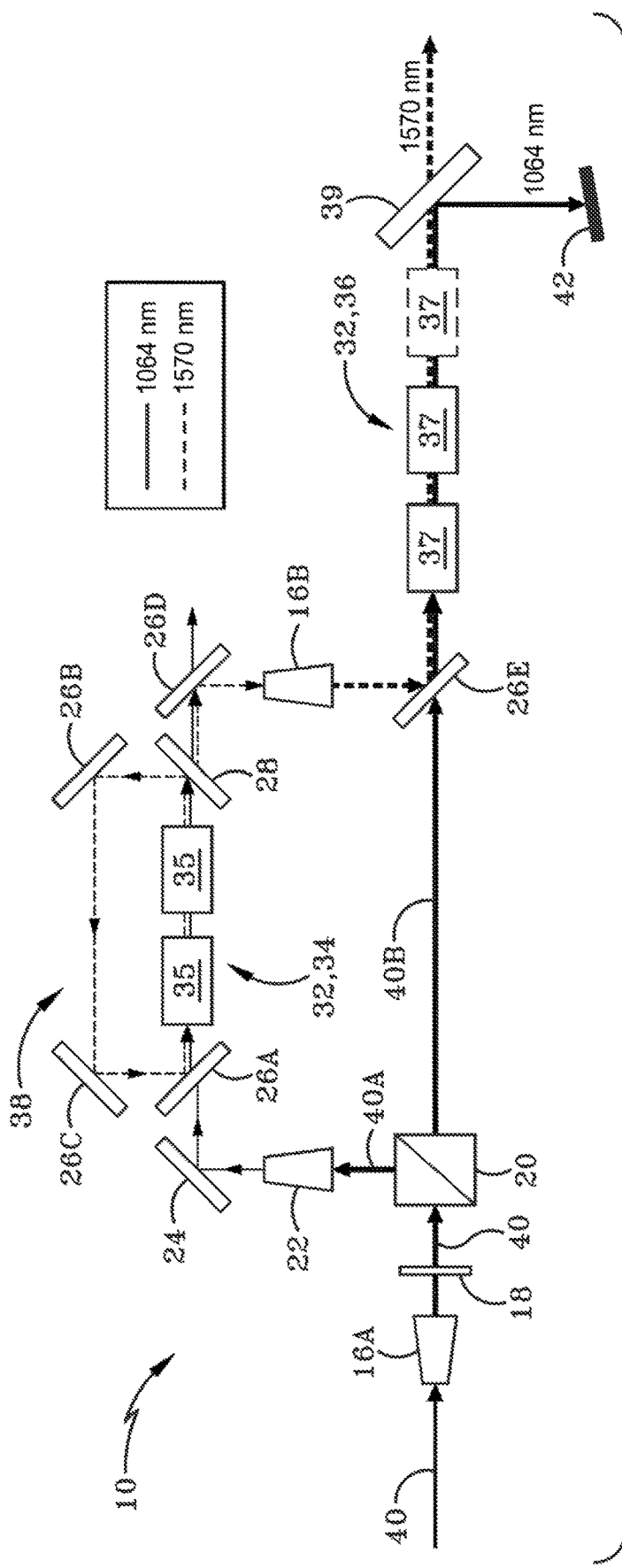
FIG. 4 is an exemplary schematic view of a high-brightness OPO-OPA converter configuration of the LDR system in accordance with an aspect of the present system.

As shown in FIG. 4, illustrating on embodiment of the recent system, the OPO-OPA converter system 10 comprises a 1064 nm wavelength laser 40 which is coming out of the Nd:YAG laser 13 excited by the diode pumping laser 12 (as shown in FIG. 2), a set of beam expanders 16A, 16B, a half wave plate 18, a beam polarizer 20, a beam reducer 22, a plurality of mirrors 24, 26A, 26B, 26C, 26D, 26E, 39, an optical parametric oscillator (OPO) output coupler 28, an beam absorber 42, and an OPO-OPA converter 32 which further comprises a Potassium Titanyl Phosphate optical parametric oscillator (KTP OPO) 34 and a Potassium Titanyl Phosphate optical parametric amplifier (KTP OPA) 36. The OPO 34 further comprises a plurality of KTP crystals 35. The OPA 36 further comprises a plurality of KTP crystals 37. The KTP OPO 34, three mirrors 26A, 26B, 26C, and the OPO output coupler 28 define a laser cavity 38 configured to generate 1572 nm wavelength laser. The mirror 24 is a high reflective mirror at 1064 nm. The mirrors 26A, 26B, 26C, 26D, 26E are high reflective at 1572 nm and high transmitive at 1064 nm mirrors. The mirror 39 is a high reflective at 1064 nm and high transmitive at 1570 nm mirror.

As shown in FIG. 4, a first beam expander 16A, the half wave plate 18, and beam polarizer 20 are horizontally aligned with an Nd:YAG laser of 1064 nm wavelength. The first mirror 24 is located between the beam reducer 22 and the OPO 34. The beam reducer 22 and the high reflective first mirror 24 are vertically aligned with the beam polarizer 20 so that a portion of the Nd:YAG laser of 1064 nm wavelength goes through the center of beam reducer 22 and the first mirror 24. The mirror 24 is reflective at 1064 nm. The beam reduce 22 reduces the diameter of the first split laser 40A. A mirror 26A, the OPO 34, and the OPO output coupler 28 are horizontally aligned with the mirror 24 so that the Nd:YAG laser of 1064 nm wavelength can enter the cavity 38 after perpendicularly being reflected by the mirror 24. The mirror 26B is vertically aligned with the OPO output coupler 28. The mirror 26C is horizontally aligned with the mirror 26B and vertically aligned with the mirror 26A. The mirror 26D is horizontally aligned with the OPO output coupler 38 and vertically aligned with a second beam expander 16B. A second mirror 26E, that is located between the beam expander 16B and the OPA 36, is vertically aligned with the second beam expander 16B and horizontally aligned with the OPA 36.

Particularly, the OPO 34 converts a portion of 1064 nm wavelength laser beam coming from the diode pumped Nd:YAG laser 13 to an "eyesafe" laser with wavelength at 1572 nm using the KTP crystal 35 which is a non-linear and oriented for Non-Critical Phase Matching (NCPM) in a resonant oscillator configuration. When pumped at 1064 nm, the combination of high parametric gain, NCPM condition and energy conservation efficiently generate a "signal" wavelength at 1572 nm and an "idler" wavelength at 3293 nm. For this application, the oscillator is singly resonant to produce a maximum output at 1572 nm, which is subsequently amplified in the OPA 36. This OPO-OPA converter configuration allows for a low level, near diffraction limited signal beam to be generated in the OPO 34, which is later amplified by at least a factor of 10 in the optical parametric amplifier OPA 36 without inducing beam quality degradation. Diffraction limited operation is achieved by reducing the energy level to 20 mJ and the beam diameter to less than 1 mm. The combination of the small spot size with the OPO cavity 38 can generate 5-10 mJ of 1572 nm output laser with diffraction limited beam quality. Most importantly, maintaining the energy level less than 20 mJ in the KTP crystals in the OPO 34 will avoid damaging the crystals in the OPO. Furthermore, the OPO-OPA converter system 10 is proportionally split between the OPO 110 and OPA 112 and conditioned to provide the optimized energy levels for efficient and damage free operation of the OPO-OPA converter.

In operation, as shown in FIG. 2 and FIG. 4, the diode pumping laser 12 which has 807 nm wavelength can pump or excite an Nd:YAG medium in the Nd:YAG laser 13 to generate the 1064 nm wavelength laser 40. Initially, the 1064 nm wavelength laser 40 has a total energy of 350 mJ. At the optical beam selector 15, a user can select between a tactical mode and training mode. In tactical mode, a user can select 1064 nm wavelength laser for target designation. In training mode, a user can select 1572 nm wavelength laser for range finding and active imaging. If tactical mode is selected as shown in FIG. 2, then the 1064 nm wavelength laser 40 is routed directly out of the LDR system 11 without passing the OPO-OPA converter system 10. On the other hand, if the training mode is selected, then the 1064 nm wavelength laser 40 is routed directly into the OPO-OPA converter system 10 so that the laser 1064 nm wavelength laser 40 is converted into a 1572 nm wavelength laser and directed out of the LDR system 11 for range finding and active imaging purpose.

In the training mode, the 1064 nm wavelength laser 40 passes through the first beam expander 16A, and the half wave plate 18 as shown in FIG. 4. At the polarizer 20, the 1064 nm wavelength laser 40 is split into two laser beams by energy ratio. A first split laser beam 40A which has about 20 mJ of energy goes to the KTP OPO 34 and a second split laser beam 40B which has about 330 mJ of energy directly goes to KTP OPA 36 after passing through the mirror 26E. After passing through the beam reducer 22, the first split laser beam 40A may have a narrowed beam diameter which is less than 1.0 mm. The narrowed first split laser beam 40A is bounced off the mirror 24 to be directed to enter the cavity 38 which enables the change of the 1062 nm wavelength laser 40 into a 1572 nm wavelength laser beam. In the cavity 38, the narrowed first split laser 40A passes through the KTP OPO 34 and bounces off the OPO output coupler 28 and the mirrors 26B, 26C respectively. Finally, the narrowed first split laser 40A is bounced back to the mirror 26A. The narrowed first split laser 40A bounces back and forth within the cavity 38 until the narrowed first split laser 40A reaches a wavelength of 1572 nm. As the narrowed first split laser 40A reaches a wavelength of 1572 nm, the narrowed first split laser 40A finally passes through the OPO output coupler 28 and heads toward the mirror 26D. Ideally, the narrowed first split laser 40A should only have a 1572 nm wavelength. However, practically, the narrowed first split laser 40A may have both 1062 nm and 1572 nm wavelengths. Thus, the mirror 26D will filter out the 1062 nm wavelength laser beam by transmitting a 1062 nm wavelength beam through the mirror 26D, but reflect only a 1572 nm wavelength laser beam to the second beam expander 16B. After passing the second beam expander 16B, the narrowed first split laser 40A is expanded so the narrowed first split laser 40A regains its original beam diameter. The first split laser 40A which only has 1572 nm wavelength bounces off the mirror 26E.

Finally, the first split laser 40A which is transmitted through the KTP OPO 34 and the second split laser 40B which is not transmitted through the KTP OPO 34 will meet at the KTP OPA 36 for beam energy amplification and beam conditioning. Here, the first split laser 40A which has a 1572 nm wavelength is used as a seed source for the second split laser 40B which has a 1062 nm wavelength so that approximately 30-40% of the second split laser 40B is converted to a 1572 nm wavelength laser beam. After passing through the mirror 39, the first split laser 40A with a 1572 nm wavelength laser beam has an energy level of 100 mJ. Moreover, the first split laser 40A with a 1572 nm wavelength laser beam maintains diffraction limited or near diffraction limited beam quality. However, the remaining portion of the second split laser 40B which has a 1064 nm wavelength laser beam is reflected by the mirror 39 as shown in FIG. 2. The reflected laser is dumped to the beam absorber 42 which can absorb a 1064 nm wavelength laser beam so that it cannot be routed out of the LDR system.

Figure 5A:
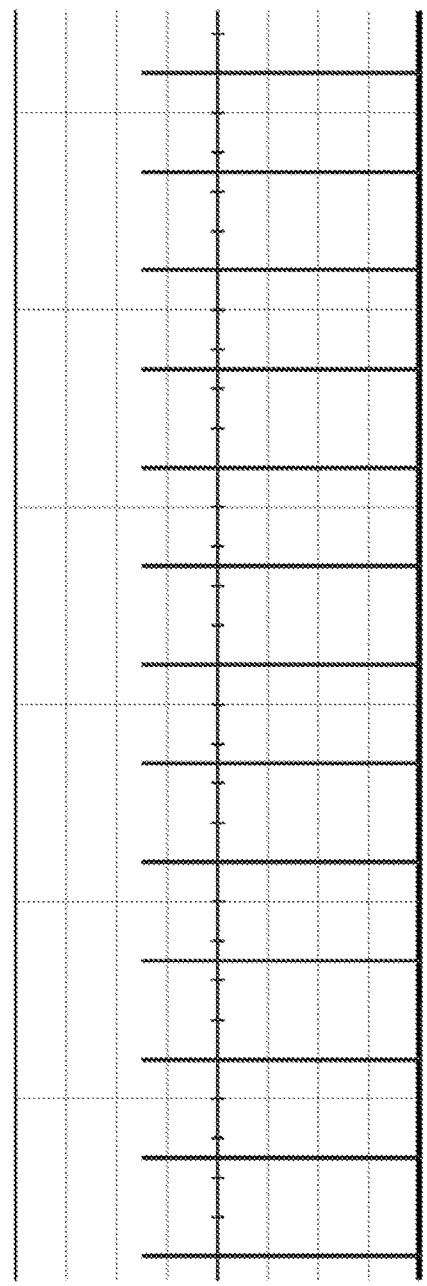
FIG. 5A is an exemplary graph showing the LDR system of FIG. 4 operated in continuous pulse mode.
Figure 5B:
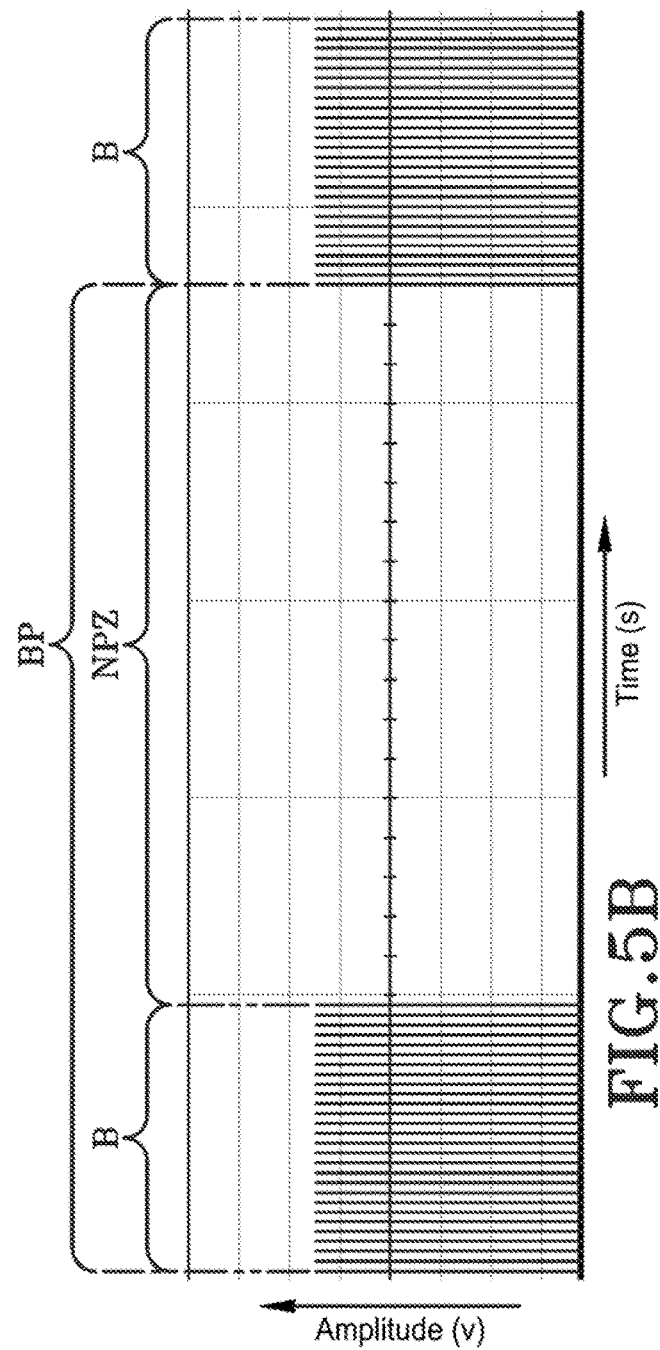
FIG. 5B is an exemplary graph showing the LDR system of FIG. 4 operated in burst pulse mode.

As depicted in FIG. 5A and FIG. 5B, the OPO-OPA converter 10 can be operated in two different modes. As depicted in FIG. 5A, the converter 10 can be operated in continuous mode. In the continuous mode, the laser pulses are constantly set at 20 Hz of pulse repetition rate so that every pulse is repeatedly emitted in every $\frac{1}{20}$ second. The height of each pulse indicates the amplitude signal (Volts) detected from a photodetector. In this exemplary graph, the pulse repetition rate is set at 20 Hz. However, alternatively, the pulse repetition rate can be set from about 8 Hz up to about 20 Hz.

As depicted in FIG. 5B, a user may select to operate the OPO-OPA converter system 10 in burst mode instead of continuous mode. Burst mode refers to emitting the same number of pulses, but at a faster rate than in the continuous mode, followed by an off time, which is also known as no pulse zone (as indicated by an arrow NPZ), until the next burst of pulses which is also called a pulse burst envelope (as indicated by an arrow B). For example, in FIG. 5B, there are two pulse burst envelopes and a single no pulse zone. The burst period is defined time between the first burst pulse in the first pulse burst envelope to the first burst pulse in the second pulse burst envelope (as indicated by an arrow BP). In the burst mode operation, the burst pulse output can be formatted to various waveforms such as constant amplitude, linear ramp, or saw tooth. However, any programmable function or waveform can be used as well. In addition to the waveforms, burst pulse repetition rate, burst period, and the number of pulses can also be changed from burst to burst cycle for a specific detection algorithm. In the exemplary graph of FIG. 5B, the laser emits pulses at 200 Hz. However, in another example, the pulse repetition rate can be up to 1 kHz, which controls the laser pulsing rate to that same rate, allowing for objects of interest to be imaged at a higher data rate for declaration. The duty factor of the pump diode is limited to a safe laser diode junction temperature (less than about 90° C.), but allows a varied laser pulse repetition rate, burst period and number of transmitted pulses within that duty factor. The combination of the diffraction limited beam quality and the burst mode enables long range precision imaging, object identification, tracking, and active target designation.

Figure 6:
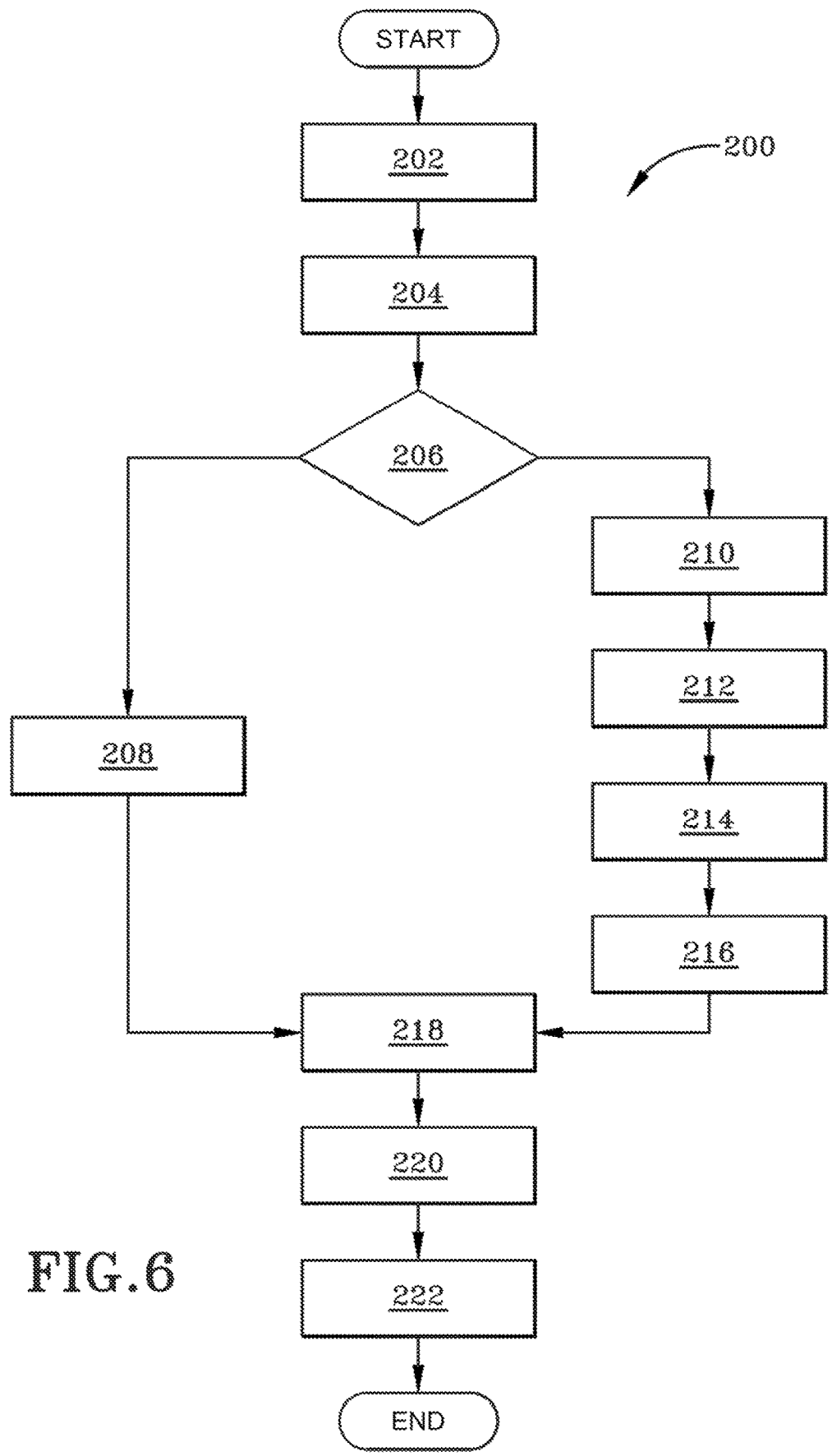
FIG. 6 is a flow chart showing a method of using the LDR system in FIG. 4.

As depicted in FIG. 6, a method 200 to implement a method of using the LDR system that includes the OPO-OPA converter. Step 202 comprises activating and electrically controlling the diode pumping laser 12 which has 807 nm wavelength laser beam. Step 204 comprises exciting a Nd:YAG medium of the Nd:YAG laser 13 to generate the 1064 nm wavelength laser 40 by the diode pumping laser 12. Step 206 comprises a user selecting either tactical mode (1064 nm) or training mode (1572 nm) by switching an optical beam selector 15 provided in the LDR system 11. The optical beam selector 15 may be in the form of a switch that the user can move from a first position to a second position. In the first position, the user may elect to use the LDR system 11 in a rangefinding mode. In the second position, the user may elect to use the LDR system 11 in a designation mode. The beam selector 15 may further be used to switch between a tactical mode and a training mode. If the tactical mode (1064 nm) is selected in step 206, then step 208 comprises directly routing the 1064 nm wavelength laser 40 out of the LDR system 11 without passing through the OPO-OPA converter system 10. If the training mode is selected in step 206, step 210 comprises directly routing the 1064 nm wavelength laser 40 to the OPO-OPA converter system 10. Step 212 comprises the 1064 nm wavelength laser 40 directed to OPO-OPA converter system 10 in step 212 being split into two laser beams 40A, 40B. Step 214 comprises directing the first split laser 40A into the laser cavity 38 which contains the OPO 34 and circulating the first split laser 40A in the laser cavity until the first split laser 40A reaches 1572 nm wavelength. The first split laser 40A is circulated in the cavity 38 by reflecting the first split laser 40A off the plurality of mirrors 26A, 26B, 26C and the OPO output coupler 28 and through one or more OPO crystals 35 until the wavelength of the first split laser 40A reaches about 1570 nm. Step 216 comprises the first split laser 40A exiting the laser cavity 38 after the first split laser reaches 1572 nm wavelength. Step 218 comprises the first split laser 40A and the second split laser 40B entering into the OPA. Step 220 comprises converting the wavelength of part of the second split laser 40B from 1064 nm to 1572 nm using the first split laser 40A as a seed source. Step 222 comprises directly routing a 1572 nm wavelength laser out of the LRD system 11 and directing a 1064 nm wavelength laser by the mirror 39. A 1574 nm wavelength laser is used for a range finding, and a 1064 nm wavelength laser is dumped. The remaining part of the second spilt laser 40B that was not converted to a 1574 nm wavelength laser is dumped.

It is believed that the crystals used in the optical parametric oscillator optical parametric amplifier (OPO-OPA) converter can be different to Potassium Titanyl Phosphate (KTP) such as $KTiOAsO_4$ (KTA), $RbTiOPO_4$ (RTP), or $RbTiOAsO_4$ (RTA) such that the laser used for training and range finding can have different wavelength than 1572 nm. However, due to the materials used in the OPO-OPA converter, the wavelength is greater than 1400 nm so that it can be used for training purpose as well as range finding purposes. Moreover, the number of crystals in the optical parametric oscillator optical parametric amplifier (OPO-OPA) converter can be varied.

Furthermore, it is believed that the LDR system 11, which contains all the optical components for pump laser generation (1064 nm) and conversion to 1572 nm, is reconfigured by changing the location of some optical components, replacing other optics and modifying the laser optical path to obtain diffraction limited operation or near diffraction limited operation at 1572 nm. Most importantly, this reconfigured optical bench has the same opto-mechanical and thermal interface as the legacy optical bench, allowing legacy lasers to be retrofit with the "new" optical bench, which improves performance and is transparent to the user. Furthermore, it is believed that a portion of the system may be adaptively connected with a conventional laser designator system.

While the present discourse has been described in connection with the preferred embodiments of the various figures, it is to be understood that other similar embodiments may be used or modifications or additions may be made to the described embodiment for performing the same function of the present discourse without deviating therefrom. Therefore, the present discourse should not be limited to any single embodiment, but rather construed in breadth and scope in accordance with the recitation of the appended claims.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the invention is not limited to the exact details shown or described.

What is claimed:

1. A long range laser target designator/rangefinder (LDR) system, comprising:
    a 1064 nm wavelength laser, wherein a medium of the laser is adapted to be excited by a laser pumping source;
    an optical beam selector, wherein the optical beam selector is selectable between a range finding mode and a target designation mode;
    an optical parametric oscillator-optical parametric amplifier (OPO-OPA) converter system wherein the converter system comprises an OPO-OPA converter, a half wave plate and a beam reducer, wherein the 1064 nm wavelength laser passes through the OPO-OPA converter system if the range finding mode is selected and bypasses the OPO-OPA converter system if the target designation mode is selected;
    a polarizer located between the half wave plate and an optical parametric oscillator (OPO) of the OPO-OPA converter system, wherein the polarizer splits the 1064 nm wavelength laser into a first split laser beam and a second split laser beam, wherein the first split laser beam has a low energy level of less than or equal to 20 mJ; and
    a beam reducer located between the polarizer and the OPO, wherein the beam reducer is configured to reduce a diameter of the first split laser beam prior to entering a cavity defined by the OPO-OPA converter, wherein the diameter of the reduced first split laser beam is reduced to less than 1 mm.

2. The LDR system of claim 1, further comprising a beam expander located between the laser pumping source and the half wave plate.

3. The LDR system of claim 1, wherein the optical beam selector is a switch.

4. The LDR system of claim 1, further comprising a first mirror located between the beam reducer and the OPO.

5. The LDR system of claim 1, further comprising a beam expander located between an optical parametric oscillator (OPO) of the OPO-OPA converter and an optical parametric amplifier (OPA) of the OPO-OPA converter.

6. The LDR system of claim 5, further comprising a second mirror located between the beam expander and the OPA.

7. The LDR system of claim 1, wherein the OPO-OPA converter includes one or more crystals and wherein the crystals are comprised of Potassium Titanyl Phosphate (KTP), $KTiOAsO_4$ (KTA), $RbTiOPO_4$ (RTP), or $RbTiOAsO_4$ (RTA).

8. The LDR system of claim 1, wherein the laser pumping source is selectively operated in a continuous pulse mode or burst pulse mode.

9. The LDR system of claim 8, wherein the laser pumping source is operated in the continuous mode and is operated at a pulse repetition rate of from 8 Hz up to 20 Hz.

10. The LDR system of claim 8, wherein the laser pumping source is operated in the burst pulse mode and is operated at a pulse repetition rate of from 0.2 kHz up to 1 kHz.

11. A method of determining a range of a target and designating the target comprising:
providing a long range laser target designator/rangefinder (LDR system) including an Optical Parametric Oscillator-Optical Parametric Amplifier converter (OPO-OPA converter) having a beam expander, a half wave plate and a polarizer;
pumping a laser source;
generating a 1064 nm wavelength laser beam;
selecting between a range finding mode and a target designation mode via an optical beam selector, wherein the target designation mode bypasses the OPO-OPA converter;
directing the 1064 nm wavelength laser beam through the beam expander, through the half wave plate and into the polarizer;
splitting the laser beam in the polarizer into a first split laser beam and a second split laser beam, wherein the first split laser beam has a low energy level of less than or equal to 20 mJ;
directing the first split laser beam into a beam reducer;
reducing a diameter of the first split laser beam in the beam reducer to less than 1 mm; and
directing the reduced diameter first split laser beam into an OPO of the OPO-OPA converter, wherein the OPO generates a diffraction limited beam from the reduced diameter first split laser beam and a cavity defined by the OPO-OPA converter.

12. The method of claim 11, further comprising:
directing the first split laser beam through a beam reducer and into the cavity defined by the OPO-OPA converter;
circulating the first split laser beam in the cavity by reflecting the first split laser beam off a plurality of mirrors and through one or more crystals in an OPO of the OPO-OPA converter until the wavelength reaches approximately 1570 nm; and
directing the 1570 nm first split laser beam through an output coupler through a second beam expander and into an OPA of the OPO-OPA converter.

13. The method of claim 12, further comprising:
utilizing the 1570 nm first split laser beam in the OPA as a seed source;
directing the second split laser beam from the polarizer into the OPA;
converting the wavelength of at least part of the second split laser beam to 1570 nm using the seed source.

14. The method of claim 13, further comprising;
deflecting a remaining part of the second split laser beam exiting the OPA and
transmitting the 1570 nm wavelength lasers directly out of the OPA and
range finding the target using the 1570 nm wavelength lasers for range finding the target.

15. The method of claim 11, further comprising:
electronically controlling the laser pumping source and selecting to operate the laser pumping source in a continuous pulse mode or a burst pulse mode.

16. The method of claim 15, wherein the laser pumping source is operated in the continuous pulse mode at a pulse repetition rate of from 8 Hz up to 20 Hz.

17. The method of claim 15, wherein the laser pumping source is operated in the burst pulse mode at a pulse repetition rate of from 0.2 kHz up to 1 kHz.

18. The method of claim 11, wherein the generated laser has energy; and the method further comprises:
passing the generated laser through a half wave plate.

19. The method of claim 11, further comprising:
directing the first split laser beam through a beam reducer and into a cavity defined by the OPO-OPA converter;
circulating the first split laser beam in the cavity by reflecting the first split laser beam off a plurality of mirrors and through one or more crystals in an OPO of the OPO-OPA converter until the wavelength reaches 1570 nm; and
directing the 1570 nm first split laser beam through an output coupler through a second beam expander and into an OPA of the OPO-OPA converter.

* * * * *